| United States Patent [19] | [11] Patent Number: 4,703,100 |
| Rasshofer et al. | [45] Date of Patent: Oct. 27, 1987 |

[54] PROCESS FOR THE PRODUCTION OF POLYISOCYANATES CONTAINING UREA AND/OR BIURET GROUPS, PREPARATIONS OBTAINABLE THEREBY AND THEIR USE

[75] Inventors: Werner Rasshofer, Cologne; Reiner Paul, Mülheim-Ruhr; Klaus Seel, Cologne; Christian Weber, Leverkusen, all of Fed. Rep. of Germany

[73] Assignee: Bayer Aktiengesellschaft, Leverkusen, Fed. Rep. of Germany

[21] Appl. No.: 855,296

[22] Filed: Apr. 24, 1986

[30] Foreign Application Priority Data

May 9, 1985 [DE] Fed. Rep. of Germany ....... 3516730

[51] Int. Cl.$^4$ .................... C08G 18/10; C08G 18/32; C08J 9/00
[52] U.S. Cl. ....................................... 528/66; 528/59; 528/67; 521/99; 521/159; 521/160; 521/901; 521/902
[58] Field of Search ................. 521/99, 159, 160, 901, 521/902; 528/44, 59, 67, 66; 560/335

[56] References Cited

U.S. PATENT DOCUMENTS

| 4,474,901 | 10/1984 | Dominguez | 521/163 |
| 4,513,133 | 4/1985 | Dominguez | 528/49 |
| 4,530,941 | 7/1985 | Turner et al. | 521/176 |
| 4,581,386 | 4/1986 | Taylor et al. | 521/125 |
| 4,582,887 | 4/1986 | Dominguez et al. | 528/48 |
| 4,618,706 | 10/1986 | Scholl et al. | 560/335 |

*Primary Examiner*—John Kight
*Assistant Examiner*—Dennis R. Daley
*Attorney, Agent, or Firm*—Gene Harsh; Joseph C. Gil; Thomas W. Roy

[57] ABSTRACT

The present invention is directed to a process for the production of urea- and/or biuret-modified polyisocyanates by reacting organic polyisocyanates with a mixture of high molecular weight isocyanate-reactive compounds and low molecular weight isocyanate-reactive compounds, wherein at least 25% of the isocyanate-reactive groups are primary amino groups. The present invention is further directed to the products obtained by this process and their use for the production of polyisocyanate polyaddition products, especially for the preparation of molded articles by the RIM process.

14 Claims, No Drawings

PROCESS FOR THE PRODUCTION OF POLYISOCYANATES CONTAINING UREA AND/OR BIURET GROUPS, PREPARATIONS OBTAINABLE THEREBY AND THEIR USE

BACKGROUND OF THE INVENTION

1. Field of the Invention

This invention relates to a new process for the production of new polyisocyanate preparations containing urea and/or biuret groups by the reaction of organic polyisocyanates with subequivalent quantities of organic compounds containing isocyanate-reactive groups, of which at least some are primary or secondary amino groups; to the polyisocyanate preparations obtainable by this process; and to their use in the production of plastics by the isocyanate polyaddition process, more especially in the production of molded plastics by reaction injection molding.

2. Description of the Prior Art

The production of urethane-modified polyisocyanate preparations, i.e. isocyanate-terminated prepolymers and semiprepolymers, especially those based on polyisocyanates or polyisocyanate mixtures of the diphenylmethane series (4,4'-diisocyanatodiphenylmethane, mixtures thereof with 2,4'- and, optionally 2,2'-diisocyanatodiphenylmethane or phosgenation products of aniline/formaldehyde condensates which, in addition to these diisocyanates, contain higher homologues thereof) and various polyhydroxyl compounds is known (cf. for example EP-A Nos. 10,850 or 66,130: DE-OS Nos. 2,347,207, 2,404,166, 2,513,793, 2,513,796, 2,620,222, 2,622,104, 2,732,182, 2,737,338, 2,804,375, 2,810,596, 2,815,579 or 2,913,126: U.S. Pat. Nos. 3,644,457, 4,055,548, 4,234,714 or 4,321,333 and also GB-P No. 1,369,334).

The processes described in these prior publications generally comprise liquefying diisocyanatodiphenylmethane, more especially 4,4'-diisocyanatodiphenylmethane, which is solid at room temperature or reducing the tendency towards crystallization during storage at low temperatures of polyisocyanate mixtures of the diphenylmethane series which are liquid at room temperature.

However, in the prepolymerization or semiprepolymerization of polyisocyanates with polyols, certain compromises have to be made in terms of the structure and molecular weight of those polyols in order to achieve a liquefying effect, so that polyhydroxyl compounds which produce the best mechanical properties in the polyurethane plastics produced from the polyisocyanate preparations often cannot be used for the prepolymerization or semiprepolymerization. Another disadvantage is that the urethane groups present in the prepolymers or semiprepolymers show poor thermal stability compared with urea or amide groups, so that the plastics predominantly containing urethane groups which are produced from the prepolymers or semiprepolymers generally show poorer mechanical properties at elevated temperatures than comparable plastics in which the urethane groups or at least some of the urethane groups are replaced by urea groups.

The production of polyisocyanate preparations containing urea and/or biuret groups is also known. Thus, DE-PS No. 1,215,365 describes the production of relatively high molecular weight biuret polyisocyanates by reaction of at least 3 moles of an organic diisocyanate with 1 mole of a $\omega,\omega'$-diaminopolyether having an average molecular weight of 200 to 6000, to which a small quantity of a corresponding $\omega,\omega'$-dihydroxy or of a $\omega$-hydroxy-$\omega'$-aminopolyether may optionally be added. GB-P No. 1,078,390 describes the production of liquid polyisocyanate compositions by heating an organic diisocyanate with a solution of an aromatic diamine in an organic solvent for 1 to 4 hours to a temperature of 150° to 200° C.

Isocyanate compositions containing urethane groups in addition to biuret and urea groups may also be obtained by reaction of mixtures of ketones and dior polyamines with di- or poly-isocyanates in accordance with GB-P No. 1,263,609. According to DE-OS No. 1,963,190, liquid, diprimary aromatic diamines, of which the reactivity to isocyanates is reduced by electrophilic or sterically hindering substituents, are reacted with polyisocyanates to form liquid, stable biuret polyisocyanates. According to DE-OS No. 2,010,887, mono- and/or polyamines containing secondary amino groups are reacted with polyisocyanates at 80° to 200° C. to produce liquid biuret polyisocyanates. According to DE-OS No. 2,032,547, urea-modified isocyanates which are liquid at −20 to +80° C. are formed from these starting components. DE-OS No. 2,261,065 describes the reaction of organic polyisocyanates with subequivalent quantities of aliphatic or cycloaliphatic diamines to form the corresponding biuret polyisocyanates. According to DE-OS No. 3,003,543, urea-modified polyisocyanates are obtained by reaction of simple polyisocyanates with subequivalent quantities of polyamines containing more than three non-aromatically bound amino groups. According to DE-OS No. 3,114,638, special diisocyanates and/or diamines containing aromatically bound isocyanate and amino groups are used for the production of aromatic urea- and/or biuret-modified polyisocyanates.

However, the products obtained in accordance with these prior publications have never acquired any significance, especially for the production of semirigid, optionally foamed, elastomeric molded plastics of the type obtainable by reaction injection molding. The reason for this lies primarily in the fact that the diamines hitherto used for producing the polyisocyanate preparations do not correspond to the diamines or polyamines which have hitherto been successfully used as reactants for organic polyisocyanates in the production of high-quality molded plastics by reaction injection molding.

Accordingly, the object of the present invention is to provide a process for the production of polyisocyanate preparations containing urea and/or biuret groups which combines the following advantages:

1. The reactants used for the starting polyisocyanates, optionally in addition to other compounds containing isocyanate-reactive groups, are diamines and/or polyamines of the type corresponding to those diamines and/or polyamines which have hitherto been processed with organic polyisocyanates by the one-shot process to form particularly highquality polyisocyanate polyadducts. The reactants in question are, in particular, the relatively high molecular weight "aminopolyethers" described in detail hereinafter and, above all, the low molecular weight aromatic diamines containing amino groups sterically hindered by alkyl substituents which are described in detail hereinafter. Previously, these low molecular weight diamines in particular have had to be used in admixture with the other reactants for the polyisocyanates, i.e. the diamines have been used as chain-extending agents (cf. for example GB-P No. 1,534,258). Also, it has previously not been possible to incorporate these diamines, which are responsible for the favorable mechanical properties of the polyisocyanate polyadducts into the polyadducts by way of the polyisocyanate component.

2. The production of the polyisocyanate preparations, especially when using the particularly preferred starting polyisocyanates (polyisocyanate mixtures of the diphenylmethane series containing a considerable amount of 4,4'-diisocyanatodiphenylmethane), leads to a reduction of the tendency towards crystallization of the starting polyisocyanates at room temperature or, when using 4,4'-diisocyanatodiphenylmethane, leads to the liquification of this starting diisocyanate.

3. The process may readily be carried out at relatively low temperatures and, in addition, has a wide range of variation, i.e. it is also possible to react low molecular weight di- and/or polyamines other than the preferred aromatic diamines just mentioned, which previously have given difficulty soluble ureas or polyureas when reacted with organic polyisocyanates, with organic polyisocyanates to form liquid, storable polyisocyanate preparations.

This object is achieved by the process described in detail hereinafter in which mixtures of certain relatively high molecular weight compounds containing isocyanate-reactive groups, especially amino groups, with certain low molecular weight compounds containing isocyanate-reactive groups, especially amino groups, are reacted with excess quantities of organic polyisocyanates to form storable polyisocyanate preparations containing urea and/or biuret groups. The fact that the process according to the invention is workable is surprising insofar as it was known that most of the low molecular weight diamines used in the process according to the invention, on account of their high reactivity to isocyanate groups, react instantaneously with organic polyisocyanates to form difficulty soluble ureas or polyureas.

SUMMARY OF THE INVENTION

The present invention is directed to a process for the production of urea- and/or biuret-modified polyisocyanates having an NCO-content of about 0.7 to 45% by weight by reacting (A) organic polyisocyanates having an NCO-content of about 10 to 50% by weight or mixtures of organic polyisocyanates having an NCO-content of about 10 to 50% by weight with (B) organic compounds containing isocyanate-reactive groups, maintaining an equivalent ratio of isocyanate groups in component (A) to isocyanate-reactive groups in component (B) of about 2:1 to 100:1, characterized in that component (B) contains mixtures of (a) organic compounds having an (average) molecular weight of 500 to about 20,000 and containing at least two isocyanate-reactive groups and (b) organic compounds having a molecular weight of 60 to 499 and containing at least two isocyanate-reactive groups wherein the equivalent ratio of (a) to (b), based on the isocyanate-reactive groups, is about 100:1 to 0.1:1, component (a) being based on polyethers or polyesters with a molecular weight of 500 to about 20,000 which have a functionality of at least two in the context of the isocyanate addition reaction and which contain alcoholic hydroxyl groups attached to primary and/or secondary carbon atoms and/or aromatic and/or (cyclo)aliphatically bound, primary and/or secondary amino groups or of mixtures of such compounds and component (b) being selected from (b1) aromatic diamines or triamines containing primary or secondary amino groups and having a molecular weight of 108 to 499, (b2) (cyclo)aliphatic diamines and/or triamines containing primary and/or secondary amino groups and having a molecular weight of 60 to 499, (b3) organic compounds with a molecular weight of 61 to 499 which have a functionality of at least two in the context of the isocyanate addition reaction and which contain both (i) at least one aromatically and/or (cyclo)aliphatically bound primary and/or secondary amino group and also (ii) at least one alcoholic hydroxyl group attached to a primary or secondary carbon atom, (b4) at least dihydric alcohols optionally containing ether or ester groups and having a molecular weight of 60 to 499 and (b5) mixtures of compounds (b1) to (b4), with the proviso that at least 25% of the isocyanatereactive groups present in components (a) and (b) are primary or secondary amino groups.

The present invention is also directed to the urea- and/or biuret-modified polyisocyanate preparations obtained from this process.

Finally, the invention is directed to the use of the polyisocyanate preparations as the isocyanate component in the production of plastics by the isocyanate polyaddition process.

DETAILED DESCRIPTION OF THE INVENTION

Organic polyisocyanates having an NCO content of about 10 to 50% by weight or mixtures of organic polyisocyanates having an NCO content of about 10 to 50% by weight may be used as polyisocyanates (component (A)) in the process according to the invention.

Polyisocyanates containing aromatically bound isocyanate groups are preferably used in the process according to the invention and include 2,4-diisocyanatotoluene, 2,6-diisocyanatotoluene, such as for example 1,2-bis-(4-isocyanatophenyl)-ethane, alkyl-, more especially methyl-substituted diisocyanatodiphenylmethanes of the type described, for example, in European Pat. No. 24,665 or 46,556 and particularly polyisocyanates or mixtures of polyisocyanates of the diphenylmethane series. Mixtures of these polyisocyanates may also be used in the process according to the invention. The preferred polyisocyanates or polyisocyanate mixtures are those of the diphenylmethane series such as 4,4'-diisocyanatodiphenylmethane, mixtures thereof with 2,4' and, optionally, 2,2'-diisocyanatodiphenylmethane containing up to 70% by weight and preferably up to 20% by weight, based on the mixture as a whole, of 2,4'-diisocyanatodiphenylmethane, the content of 2,2'-diisocyanatodiphenylmethane generally not exceeding 5% by weight: polyisocyanate mixtures of the type which may be obtained by phosgenation of aniline/formaldehyde condensates and which, in addition to diisocyanatodiphenylmethane isomers of the above-mentioned type, contain varying amounts of higher homologous polyisocyanates (generally 5 to 60% by weight, based on the mixture as a whole); and reaction products containing urethane groups of the above-mentioned di- and/or polyisocyanates with subequivalent quantities of aliphatic polyhydroxyl compounds having a molecular weight of 62 to about 700, such as ethylene glycol, trimethylolpropane, propylene glycol, dipropylene glycol or polypropylene glycols having molecular weights in the above-mentioned range, or di- and/or polyisocyanates modified by partial carbodiimidization of the isocyanate groups of the above-mentioned di- and/or polyisocyanates.

Particularly preferred starting materials A) include the 4,4'-diisocyanatodiphenylmethane derivatives which are liquid at room temperature, for example the urethane-modified polyisocyanates which may be obtained in accordance with DE-PS No. 1,618,380 (U.S. Pat. No. 3,644,457) by reaction of 1 mole of 4,4'-diisocyanatodiphenylmethane with about 0.05 to 0.3 moles of low molecular weight diols or triols, preferably polypropylene glycols having a molecular weight below about 700, or the carbodiimide- and/or uretone imine-modified diisocyanates based on 4,4'-diisocyanatodiphenylmethane of the type obtainable in accordance with U.S. Pat. No. 3,152,162, U.S. Pat. Nos. 3,384,653, 3,449,256, DE-OS No. 2,527,685 or EP-OS No. 5,233 (U.S. Pat. No. 4,154,752). The corresponding modification products based on mixtures of 2,4'- and 4,4'-diisocyanatodiphenylmethane or even mixtures of 4,4'-diisocyanatodiphenylmethanes modified as described above with small quantities of polyisocyanates of the diphenylmethane series having a functionality of higher than two for example those of the type described in DE-OS No. 2,624,526, are also included among the particularly preferred polyisocyanates. The preferred polyisocyanates cyanates used in accordance with the invention are generally polyisocyanates or polyisocyanate mixtures of the diphenylmethane series which are liquid at room temperature, which may optionally have been chemically modified as described, which have an (average) NCO-functionality of about 2 to 2.2, preferably 2, and in which 4,4'-diisocyanatodiphenylmethane is present as the main component (more than 50% by weight).

Polyisocyanates or polyisocyanate mixtures of the diphenylmethane series such as these, optionally in admixture with up to about 50 NCO equivalent percent, based on the mixture as a whole, of other aromatic polyisocyanates, may optionally be used as polyisocyanates in the process according to the invention. However, it is most preferred to use the abovementioned polyisocyanates or polyisocyanate mixtures of the diphenylmethane series as sole polyisocyanate component in the process according to the invention.

The compounds containing isocyanate-reactive groups (component (B)) are mixtures of (a) certain relatively high molecular weight containing isocyanate-reactive groups with (b) certain low molecular weight compounds containing isocyanate-reactive groups, components (a) and (b) being present in these mixtures in quantities corresponding to an equivalent ratio between the respective isocyanate-reactive groups in (a) and (b) of about 100:1 to 0.1:1 and preferably of about 10:1 to 0.2:1. In practice, this generally means that about 99 to 50% by weight and preferably about 97.5 to 75% by weight of component (B) are compounds (a) the remainder compound (b). The nature and quantitative ratios between components (a) and (b) are selected in such a way that at least about 25%, preferably at least about 50% and, more preferably, at least about 75% of the isocyanate-reactive groups in component (B) are primary or secondary, preferably primary amino groups.

Component (a) is selected from polyethers or polyesters which have a molecular weight of 500 to about 20,000, preferably about 1000 to 7000, and which contain at least two, preferably terminal, isocyanatereactive groups. These isocyanate-reactive groups are alcoholic hydroxyl groups attached to primary or secondary carbon atoms and/or aromatically or (cyclo)aliphatically bound primary or secondary, preferably primary, amino groups. The molecular weights mentioned may be determined, for example, by vapor pressure osmometry.

Accordingly, aminopolyethers, aminopolyesters, polyether polyols, polyester polyols or mixtures thereof known per se from polyurethane chemistry and complying with the above-mentioned requirements may be used as component (a). Polyethers or polyesters containing both amino and hydroxyl groups may of course also be used.

Polyether polyols suitable as component (a) are the alkoxylation products of suitable starter molecules using ethylene oxide and/or propylene oxide as known per se in polyurethane chemistry, the alkylene oxides mentioned being useable both in admixture and also successively in the production of the alkoxylation products. Suitable starter molecules include water, simple dihydric alcohols (such as 1,2-dihydroxyethane, 1,2-dihydroxypropane, 1,3-dihydroxypropane, 1,4-dihydroxybutane and 1,6-dihydroxyhexane), trimethylolpropane, glycerol, pentaerythritol, cane sugar and mixtures thereof. When solid starter molecules, such as cane sugar are used, liquefying, low-functionality starter molecules of the type mentioned by way of example are generally used at the same time.

Polyester polyols suitable as component (a) are those known per se from polyurethane chemistry including the reaction products of polybasic carboxylic acids such as adipic acid, phthalic acid, tetrahydrophthalic acid and/or hexahydrophthalic acid with excess quantities of simple, polyhydric alcohols mentioned above.

The above polyesters or polyethers contain amino groups in addition to any hydroxy groups present as isocyanate-reactive groups and which are known per se from polyurethane chemistry are suitable for use as component (a). To produce aminopolyethers or polyesters such as these, the polyether polyols or polyester polyols are chemically modified by replacement of at least some of the hydroxyl groups by amino groups. Processes of this type for producing aminopolyethers or esters are described, for example, in DE-AS No. 1,270,046 (reaction of the starting polyols with excess quantities of organic polyisocyanates and subsequent conversion of the terminal isocyanate groups thus introduced by reaction with secondary or tertiary carbinols and thermal splitting of the resulting urethanes), DE-AS No. 1,694,152 (reaction of the last-mentioned NCO-prepolymers with excess quantities of organic diamines), FR-PS No. 1,415,317 (conversion of the NCO-groups in the NCO-prepolymers mentioned into amino groups by reaction with formic acid and subsequent hydrolysis of the Nformyl derivatives) and DE-AS No. 1,555,907 (reaction of the NCO-prepolymers mentioned with sulfamic acid). The products obtained by the processes according to DE-AS No. 1,215,373, BE-P No. 634,741 and U.S. Pat. No.

3,654,370, i.e. the reaction products of polyether polyols or polyester polyols with ammonia in the presence of catalyst and, optionally, hydrogen are also suitable. Other processes for the production of aminopolyethers or polyesters include those described in DE-OS Nos. 2,948,419, 3,039,600, 3,112,118, 3,131,252, 3,200,021, 3,144,991, 3,144,874, 3,223,395, 3,223,400, 2,546,536, 2,019,432, 2,619,840, 2,648,774, 2,648,825, 3,035,639, in U.S. Pat. Nos. 3,044,989, 3,865,791, 4,180,644, 2,888,439 and in DE-AS No. 1,193,671.

Aminopolyesters and, above all, aminopolyethers of the type obtained by the thermal decomposition of carbamates in accordance with DE-OS No. 3,132,252 or by pressure amination of polyols in accordance with the above-mentioned publications are particularly preferred as component (a) in the process according to the invention. On a statistical average, these aminopolyesters and, in particular, aminopolyethers preferably used in the process according to the invention generally contain 2 to 6 and preferably 2 to 3 isocyanate-reactive groups per molecule. At least about 50% and preferably at least about 80% of the isocyanate-reactive groups are primary or secondary, preferably primary, amino groups which, in accordance with the foregoing observations, may be attached to both aromatic and aliphatic carbon atoms. The molecular weight of these preferred aminopolyesters and, in particular, polyethers is generally about 1000 to 7000 and preferably about 2000 to 6000.

Component (b) includes compounds of the type mentioned above under (b1) to (b4) of mixtures thereof.

Suitable compounds (b1) include aromatic diamines or triamines containing primary or secondary, preferably primary, amino groups and having a molecular weight of 108 to 499. Examples include optionally alkyl-substituted phenylene diamines or optionally alkyl-substituted diaminodiphenylalkanes which preferably contain a primary amino group on each aromatic ring such as 1,2-, 1,3- or 1,4-diaminobenzene: 2,4- or 2,6-diaminotoluene; 2,4-dimethyl-, 2,4-diethyl-, 2,4-diisopropyl- or 2,4-di-t-butyl-1,3-diaminobenzene; 2,4-diamino-mesitylene; 1,3,5-triethyl-2,4-diaminobenzene; 1,3,5-triisopropyl-2,4-diaminobenzene; 1-methyl-3,5.diethyl-2,4-diaminobenzene, 1-methyl-3,5-diethyl-2,6-diaminobenzene or technical mixtures of these two diamines: 4,6-dimethyl-2-ethyl-1,3-diaminobenzene; 3,5,3',5'-tetraethyl-4,4'-diaminodiphenylmethane: 3,5,3',5'-tetraisopropyl-4,4'-diaminodiphenylmethane; 3,5-diethyl-3',5'-diisopropyl-4,4'-diaminodiphenylmethane; 1-t-butyl-3,5-dimethyl-2,6-diaminobenzene; 4,4'-diaminodiphenylmethane; 4,4'-diaminodiphenyl-2,2propane; 3,5-diisopropyl-3'-ethyl-4,4'-diaminodiphenylmethane; 3,3',5-trimethyl-5'-isopropyl-, 3,3',5-triethyl-5'-isopropyl-, 3,3',5-trimethyl-5'-sec.butyl-, 3,3',5-triethyl-5'-sec.-butyl- or 3,3',5-triethyl-5'-sec.-butylbutyl-4,4'-diaminodiphenylmethane; and 3,3'-diethyl-5,5'-diisopropyl-, 3,3'-dimethyl-5,5'-di-sec.-butyl, 3,3'-dimethyl-5,5'-di-sec.-butyl-, 3,3'-diethyl-5,5'-di-sec.-butyl-, 3,5-dimethyl-3',5'-diisopropyl-, 3,5-diethyl-3',5'-diisopropyl-, 3,5'-dimethyl-3',5-di-sec.-butyl-, 3,5'-diethyl-3',5'-di-sec.butyl-, 3-methyl-3',5,5'-triisopropyl-, 3-ethyl3',5,5'-triisopropyl, 3-methyl-3',5,5'-triisosec.butyl-, 3-ethyl-3',5,5'-tri-sec.-butyl-, 3,3'-diisopropyl-5,5'-disec.-butyl-, 3,5-diisopropyl-3',5'-disec.-butyl-, 3-ethyl-5-sec.-butyl-3',5'-diisopropyl-, 3-methyl-5-tert.-butyl-3',5'-diisopropyl-, 3-ethyl-5-sec.-butyl-3'-methyl-5'-tert.-butyl-, 3,3',5,5'-tetraisopropyl- or 3,3',5,5'-tetra-sec.-butyl-4,4'-diaminodiphenylmethane. The production of asymmetrically substituted tetraalkyldiphenylmethane diamines such as these or mixtures thereof with symmetrically substituted tetraalkyldiphenylmethane diamines is described, for example, in DE-A No. 2,920,501.

It is also possible to use trialkylsubstituted diphenylmethane diamines such as for example 3,5,3'-triisopropyl- or 3,5-diisopropyl-3'-ethyl-4,4'-diaminodiphenylmethane, or disubstituted diamines such as 3,3'-diisopropyl-4,4'-diaminodiphenylmethane and also analogous monosubstituted diamines. Product mixtures of about 45 to 70% by weight of 3,5-diethyl-3',5'-diisopropyldiphenyl-4,4'-diamine, about 27.5 to 15% by weight of 3,5,3',5'-tetraethyldiphenylmethane-4,4'-diamine and about 27.5 to 15% by weight of 3,5,3',5'-tetraisopropyldiphenylmethane-4,4'-diamine are especially suitable.

Other aromatic diamines or triamines suitable as component (b1) include tris-(4-aminophenyl)-methane; 1,5-diaminonaphthalene: liquid polyamine mixtures of the diphenylmethane series of the type obtained by aniline/formaldehyde condensation; aromatic polyamines containing heteroatoms such as for example 3,5-diaminobenzoic acid-$C_1$-$C_{10}$-alkylesters optionally substituted by $C_1$-$C_{12}$ alkyl groups; 3,3'-dichloro-4,4'-diaminodiphenylmethane; 4,4'-diaminodiphenylsulfide; or polyamines containing secondary amino groups such as 4,4'-di-(methylamino)-diphenylmethane. It is also possible in principle to use mixtures of the polyamines mentioned by way of example.

Particular preference is given to diprimary aromatic diamines which are liquid at room temperature and which are readily miscible with component (a), especially 1,3- and/or 1,5-diaminobenzenes wherein the molecular weight is within the above-mentioned range and which contain an alkyl substituent in at least one ortho position to the amino groups. Especially preferred are those which contain at least one alkyl substituent in the ortho position to the first amino group and two alkyl substituents containing from 1 to 4 and preferably from 1 to 3 carbon atoms, which are not identical with the first alkyl substituent, in the ortho position to the second amino group, and most preferably those containing an ethyl, n-propyl, isopropyl and/or t-butyl substituent in one ortho position to the amino groups and, optionally, methyl substituents in the other ortho positions to the amino groups.

Component (b2) includes (cyclo)aliphatic diand/or triamines having a molecular weight of 60 to 499 such as 1,2-diaminoethane, 1,2-diaminopropane, 1,3-diaminopropane, 1,4-diaminobutane, 1,5-diaminopentane, 1,6-diaminohexane, 2,2,4-trimethyl-1,6-diaminohexane, 1,7-diaminoheptane, 1,8-diaminooctane, 1,10-diaminodecane, 1,11-diaminoundecane and 1,12-diaminododecane: diamines containing heteroatoms such as 1,5-diamino-3oxapentane, 1,8-diamino-3,6-dioxaoctane, 1,11-diamino-3,6,9-trioxaundecane, 1,13-diamino-4,9-dioxatridecane and 1,9-diamino-5-oxanonane: 5-amino-2,2,4-trimethyl-1-cyclopentane methylamine: 5-amino-1-aminoethyl- 1,3,3-trimethylcyclohexane (isophorone diamine): 1,4-diaminocyclohexane; 1,3-diaminocyclohexane; 1,8-diamino-p-methane; 3-aminoethyl-1-(3-aminopropyl-1-methyl)-4-methylcyclohexane; 1-methyl-2,6-diaminocyclohexane; 1-methyl-2,4-diaminocyclohexane; 4,4'-diaminodicyclohexylmethane and the 2,4'- or 2,2'-isomers thereof; 4,4'-diamino-3,3'-dimethyldicyclohexylmethane and the 2,4'- and 2,2'-diamino isomers thereof; 4,4'-diaminodicyclohexylethane; 4,4'-diaminodicyclohexylether; bis( 4'-aminocyclohexyl)-

2,2-propane; 4,4'-diaminodicyclohexane; 4,4'-diamino-3,3'-diethyldicyclohexylmethane; 1,1-di-(4'-aminocyclohexyl)-cyclohexane; 1,1-di-(4'-amino-3'-methylcyclohexyl)-cyclohexane; 4,4'-diamino-3,5-diethyl-3',5'-diisopropyldicyclohexylmethane; 4,4'-diamino-3,3',5,5'-tetraethyldicyclohexylmethane; di- or polyamines containing tertiary amino groups such as bis-(3-aminopropyl)-methyl-amine, N,N'-bis-(2-aminoethyl)-piperazine and N,N'-bis-(3-aminopropyl)-piperazine; and diamines containing secondary amino groups such as N-methylethylene diamine, N,N'-diethylethylene diamine, N,N'-dibutylhexamethylene diamine, piperazine and 2,5-dimethyl-piperazine. Also suitable as component (b2) are low molecular weight "aminopolyethers", which are homologs of the relatively high molecular weight aminopolyethers mentioned by way of example under (a), but which have a molecular weight below 500. Compounds containing at least 3 or 4 primary and/or secondary amino groups such as 1,6,11-triaminoundecane, 1,5-diamino-3-azapentane, 1,8-diamino-3,6-diazaoctane, 1,11-diamino-3,6,9-triazaundecane, 1,14-diamino-3,6,9,12-tetraazatetradecane, 1,7-diamino-4-azaheptane, 1,11-diamino-4,8-diazaundecane, 1,13-diamino-7-methyl-7-azatridecane and 1,3,5-triaminocyclohexane may also be used. Diaminoperhydroanthracenes (DE-OS No. 2,638,761) and cycloaliphatic triamines according to DE-OS No. 2,614,244 are also suitable.

Preferred starting components (b2) include 1,6-diaminohexane and also the cycloaliphatic diamines mentioned by way of example.

Suitable starting components (b3) include aminoalcohols having a molecular weight of 61 to 499 which contain at least one alcoholic hydroxyl group and at least one primary or secondary amino group. Examples of these aminoalcohols include 2-aminoethanol, 2-methyl-2-aminoethanol, 2-ethyl-2-aminoethanol, 6-methyl-3-oxa-6-azaheptanol, 6-hydroxyhexylamine, bis-$\beta$-hydroxyethylamine, bis-($\beta$-hydroxyethyl)-methylamine, bis-($\beta$-hydroxyethyl)-butylamine, bis-($\beta$-hydroxyethyl)oleylamine, bis-($\beta$-hydroxypropyl)-amine, bis-($\beta$-hydroxypropyl)-methylamine, bis-($\beta$-hydroxypropyl)-hexylamine, N,N,N'-tris-($\beta$-hydroxypropyl)-ethylene diamine, 3-aminomethyl-3,5,5-trimethylcyclohexanol, 2-amino-2-hydroxymethyl-1,3-propane diol, 2-amino-2-methyl-1,3-propane diol or 2-amino-2-methylpropanol, N-($\beta$-hydroxyethyl)ethylene diamine, N-($\beta$-hydroxyethyl)-1,2-propylene diamine, N-($\beta$-hydroxyethyl)-1,3-propane diamine, N-($\beta$-hydroxyethyl)-1,6-hexane diamine, N-($\beta$-hydroxyethyl)-1,12-dodecane diamine, N-($\beta$-hydroxypropyl)-ethylene diamine, N-($\beta$-hydroxypropyl)-1,2-propylene diamine, N-($\beta$-hydroxypropyl)-1,3-propylene diamine, N-($\beta$-hydroxybutyl)-ethylene diamine, N-($\beta$-hydroxyethyl)-1,3xylylene diamine, N-($\beta$-hydroxyethyl)-1,3- or -1,4-cyclohexane diamine, N-($\beta$-hydroxyethyl)-2,2,4-trimethyl-1,6hexylene diamine, 1-methyl-2-amino-4-[N-(2-hydroxymethyl)-amino]-cyclohexane, N-($\beta$-hydroxyethyl)-isophorone diamine, N,N'-bis($\beta$-hydroxyethyl)-ethylene diamine, N,N'-bis-($\beta$-hydroxypropyl)-ethylene diamine, N,N'-bis-($\beta$-hydroxyethyl)-1,2-propylene diamine, N,N'-bis-($\beta$-hydroxypropyl)-1-methyl-2,6- or -2,4-diaminocyclohexane, N,N'-bis-(B-hydroxypropyl)-p-xylylene diamine, N-($\beta$-hydroxyethyl)-N'-($\beta$-hydroxypropyl)ethylene diamine, 1,3-diamino-2-propanol, 1,6-diamino-2-hexanol, 1,5-diamino-3-pentanol, 3,4-diamino-2,2-dimethyl-1-butanol, the diaminocyclohexanols or 1,11-diamino-6-undecanol.

Starting materials (b4) which may be used in accordance with the invention include at least dihydric alcohols with a molecular weight of 62 to 499 which optionally contain ether or ester groups and which, apart from the alcoholic hydroxyl groups, do not contain any other isocyanate-reactive groups. Examples of these alcohols include 1,2-dihydroxyethane, 1,2-dihydroxypropane, 1,4-dihydroxybutane, 1,6-dihydroxyhexane, trimethylolpropane or glycerol. However, these synthesis components (b4) may if necessary be used in admixture with the amino-group-containing compounds (b1) to (b3) mentioned by way of example in the foregoing in the process according to the invention.

Basically, mixtures of the compounds mentioned by way of example under (b1) to (b4) may be used in the process according to the invention provided that at least about 50% and preferably at least about 80% of the isocyanate-reactive groups in component (b) as a whole are primary and/or secondary aromatically and/or (cyclo)aliphatically bound amino groups. This means that pure polyamines of the type mentioned by way of example under (b1) and (b2) have to be used not only when the last-mentioned polyhydric alcohols (b4) are used, but also when the aminoalcohols mentioned by way of example under (b3) are used, so that the last-mentioned requirement is satisfied.

Basically, component (b) may also contain synthesis components having at least some hydrazinic amino groups such as carbodihydrazide, oxalic acid dihydrazide and malonic acid, succinic acid, glutaric acid, adipic acid or sebacic acid bis-hydrazide. However, the use of these hydrazine derivatives is less preferred. The aromatic polyamines mentioned by way of example under (b1) are most preferably used as sole component (b) in the process according to the invention.

The process according to the invention is carried out by initially preparing component (B) by mixing components (a) and (b) and then reacting component (B) thus prepared with the polyisocyanate component (A) at a temperature of about 20° to 140° C. and preferably about 20° to 60° C., while maintaining an equivalent ratio of isocyanate groups to isocyanate-reactive groups of about 2:1 to 100:1 and preferably about 4:1 to 50:1. Accordingly, the isocyanate component (A) is preferably introduced first and the NCO-reactive component (B) added continuously or in portions with stirring. The addition rate is preferably selected so that the reaction mixture does not gel and remains stirrable. The NCO-reactive component is preferably added to the isocyanate component at about 20° to 30° C., preferably without external cooling or heating. During the addition, the temperature rises to around 40°–60° C. in the absence of external cooling or heating.

On completion of the reaction, the reaction mixture has a viscosity of about 20 to about 10,000 mPa.s/25° C., preferably about 100 to 10,000 mPa.s/25° C., depending upon the type of reactants used and the quantitative ratios in which they are used. The reaction mixtures thus obtained are clear solutions or fine or coarse dispersions, again depending upon the type of starting components used and the quantitative ratios in which they are used. While the clear solutions may be used as such in the process according to the invention, the dispersion systems are often preferably subjected to a thermal after-treatment. To this end, the fine or coarse dispersion is stirred for about 5 minutes to 10 hours, preferably about 30 minutes to 6 hours at about 20° to 140° C., preferably about 60° to 135° C. and most preferably about 80° to 130° C. A procedure in which the temperature is increased either continuously or in stages within the ranges mentioned during the aftertreatment is particularly suitable. During this thermal after-treatment, dispersed particles are dissolved with a reduction in the viscosity of the systems. It is assumed that a chemical conversion of the urea groups initially present into biuret groups by reaction with excess isocyanate groups plays an important part in this respect. The thermal aftertreatment leads to clear or very fine dispersions which may readily be used in accordance with the invention. The clear solutions obtained without any thermal aftertreatment and also the clear or fine dispersions obtained with the thermal after-treatment preferably have an NCO-content of about 18 to 28% by weight and a viscosity at 25° C. of about 20 to about 10,000 mPa.s.

The products obtained by the process according to the invention may advantageously be used, optionally in admixture with other polyisocyanates of the type known per se from polyurethane chemistry, for the production of polyisocyanate-based plastics and more especially for the production of urea- and/or biuret-modified polyurethane plastics. The products obtained by the process according to the invention are used with particular advantage as the polyisocyanate component in the production of molded plastics by the reaction injection molding (RIM) process and, more specifically, both for the production of rigid, semirigid and flexible integral foams and also for the production of the corresponding solid or microcellular, moldings having a bulk density of about 0.8 to 1.4, preferably about 0.9 to 1.2 g/cc.

In this application according to the invention, the products obtained by the process according to the invention are used instead of or in admixture with the polyisocyanates normally used for this purpose. This means in particular that, in the application according to the invention, the reactants and auxiliaries for the process according to the invention and also the other process parameters correspond to the prior art as represented, for example, by DE-OS Nos. 1,953,637, 2,121,670, 2,356,692, 2,363,452, 2,404,310, 2,427,273, 2,431,968, 2,307,589, 2,319,648, 3,012,126 or 3,147,736, U.S. Pat. Nos. 4,065,410 or 4,218,543 and published European Patent Applications (Publication Nos.) 17,928, 44,481 or 81,701.

The products obtained by the process according to the invention may also be used in the production of other polyurethane plastics, for example in the production of free-foamed rigid, semirigid or flexible polyurethane plastics where they are advantageously used as the polyisocyanate component instead of or in admixture with the polyisocyanates hitherto used for this purpose.

The polyurethane plastics produced with the products according to the invention are distinguished by excellent mechanical properties. Generally, they may be used for the same applications as the state-of-the-art polyurethane plastics.

In the following examples, all of the parts and percentages set forth are parts and percentages by weight.

EXAMPLES

EXAMPLE 1

A mixture of 1095 g of 4,4'-diisocyanatodiphenylmethane (MDI 44) and 2015 g of a uretone iminemodified 4,4'-diisocyanatodiphenylmethane derivative (UI-MDI) having an NCO content of 30% was initially introduced at 30° C. A mixture of 800 g of a polyoxypropylene glycol containing terminal primary amino groups and having a molecular weight of 2000 (Jeffamine D 2000, Texaco/Jefferson) and 42.6 g of a mixture of 65 parts of 1-methyl-3,5-diethyl-2,4-diaminobenzene and 35 parts of 1-methyl-3,5-diethyl-2,6-diaminobenzene (DETDA) was added with vigorous stirring over a period of 20 minutes at that temperature. The reaction mixture became heavily clouded and underwent an increase in temperature to about 55° C. The reaction mixture was then heated to an internal temperature of 125° C. over a period of 3 hours. At that temperature, the reaction mixture was clear and remained clear after cooling to room temperature. It had a viscosity of 842 mPa.s/25° C. and an NCO-content of 19.9%.

EXAMPLE 2

A mixture of 1385 g of MDI 44 and 2501 g of UI-MDI was initially introduced at 35° C. A mixture of 1085 g of the aminopolyether used in Example 1 and 57 g of DETDA was then added with thorough stirring over a period of 30 minutes. The suspension was stirred for 3 hours at 80° C. The product was cloudy at room temperature and had a viscosity of 14000 mPa.s/25° C. and an NCO-content of 21.6%.

EXAMPLE 3

After the 3 hour period of stirring at 80° C., the reaction mixture of Example 2 was stirred for another 3 hours at 120° C. After 2 h at 120° C., a clear solution had formed. The product was clear at room temperature and had an NCO content of 21.5% and a viscosity of 1040 mPa.s/25° C.

EXAMPLE 4

The reaction components of Example 2 were combined and stirred for 3 h at 100° C. The product which was cloudy at room temperature and from which nothing could be filtered off had an NCO content of 21.5% and a viscosity of 585 mPa.s/25° C.

EXAMPLE 5

A mixture of 252 g of MDI 44 and 464 g of UI-MDI was initially introduced at 30° C. A mixture of 190 g of the aminopolyether of Example 1 and 19 g of a mixture of approx. 50% of 3,5-diisopropyl-3',5'-diethyl-4,4'-diaminodiphenylmethane, approx. 25% of 3,3',5,5'-tetraethyl-4,4'-diaminodiphenylmethane and approx. 25% of 3,3',5,5'-tetraisopropyl-4,4'-diaminodiphenylmethane was added at an internal temperature of 80°to 100° C. (temperature increased by external heating). The reaction mixture immediately became heavily clouded. Upon reaching an internal temperature of 125° C., the reaction mixture became clear over a period of 5 minutes. It had an NCO-value of 21%.

EXAMPLE 6

357 g of MDI 44 are initially introduced at 40° C. A mixture of 285 g of the aminopolyether from Example 1 and 19, 4 g of a polyoxypropylene glycol containing terminal primary amino groups and having a molecular weight of 230 (Jeffamine D 230) was then added dropwise with vigorous stirring over a period of 15 minutes. The reaction mixture was then stirred for 3 h at an internal temperature of 120° C. 330 g of the product having an NCO-content of 17.3% were diluted with 328.5 g of UI-MDI. The product thus obtained had an NCO-content of 20.5% and a viscosity of 843 mPa.s/25° C.

EXAMPLE 7

A mixture of 238 g of MDI 44 and 438 g of UI-MDI is initially introduced at 60° C. A mixture of 190 g of the aminopolyether of Example 1 and 9,6 g of isophorone diamine was then added over a period of 15 minutes, resulting in clouding and the appearance of gel particles. After heating for 2 h to 130° C., the clouding and gel particles had largely disappeared. Undissolved particles were filtered off. The product had an NCO-content of 20.3%. When the amine mixture was added at 0° C., no gel particles were formed.

EXAMPLE 8

A mixture of 238 g of MDI 44 and 438 g of UI-MDI is initially introduced. A mixture of 190 g of the aminopolyether of Example 1 and 34 g of a polyoxypropylene glycol ether containing terminal primary amino groups and having a molecular weight of approximately 400 (Jeffamine D 400) was introduced at a starting internal temperature of 60° C. A suspension was formed, but passed into solution after 1 hour at 20° C. The product was also clear at room temperature and had an NCO content of 19.6% and a viscosity of 720 mPa.s/25° C.

EXAMPLE 9

The procedure was the same as in Example 8, except that 17 g as opposed to 34 g of the 400 MW aminopolyether were used. A clear product having an NCO content of 20.5% and a viscosity of 537 mPa.s/25° C. was obtained.

EXAMPLE 10

A mixture of 400 g of MDI 44 and 68 g of a 1:1 mixture (NCO content 26.5%) of UI-MDI and a tripropylene glycol-modified MDI (NCO content 23%) were initially introduced at 30° C. A mixture of 200 g of the aminopolyether of Example 1 and 10 g of DETDA was then added with stirring at room temperature. The highly viscous suspension obtained was heated to 125° C. The cloudy, but non-filterable NCO-preparation had a viscosity of 1790 mPa.s/25° C. and an NCO-content of 20.9%.

EXAMPLE 11

A mixture of 400 g of MDI 44 and 260.6 g of UI-MDI is initially introduced at room temperature. A mixture of 190 g of the aminopolyether of Example 1 and 10 g of DETDA was then added with intensive stirring. The highly viscous suspension was heated to 125° C. and became clear. The NCO-preparation, which turned slightly cloudy upon cooling to room temperature, had an NCO content of 21.4% and a viscosity of 860 mPa s/25° C.

EXAMPLE 12

A mixture of 238 g of MDI 44 and 438 g of UI-MDI was initially introduced at room temperature. A mixture of 190 g of an aromatic aminopolyether and 10 g of DETDA was then slowly added with intensive stirring and the resulting suspension was heated with stirring for 45 minutes to 125° C. The product was clear at room temperature and had a viscosity at 25° C. of 2830 mPa.s and an NCO content of 21.5%.

The aminopolyether used in this Example was obtained in accordance with DE-OS No. 3,131,352 by hydrolysis of an NCO-prepolymer having an NCO content of 3.6% as follows:

1 mole of a polyoxypropylene glycol (molecular weight 2000) was reacted for 3 hours at 80° C. with 2 moles of 2,4-diisocyanatotoluene. The NCO-prepolymer thus obtained was then hydrolyzed with aqueous potassium hydroxide at 80° C. to form the corresponding aminopolyether containing aromatically bound amino groups. The aminopolyether had an NH number of 47.2 mg KOH/g.

APPLICATION EXAMPLES

A positively controlled 1-piston high-pressure metering installation with an MQ mixing head (Maschinenfabriken Hennecke, St. Augustin) was used for producing moldings. The operating pressure was 200 bar.

Using this apparatus, the polyol and isocyanate components mentioned in Examples 13 and 14 below were thoroughly mixed and processed into molded plastics having the mechanical properties shown in those examples. The raw material temperature was 3540° C. and the temperature of the mold 60° C. The mold used was one of polished steel with internal dimensions of 200×300×4 mm, wherein the inner walls had been coated with an external wax-based release agent (Acmos Fluoricon 36/34, a product of Acmos). The respective filling times were approx. 2 seconds (Example 13) and approx. 1.25 seconds (Example 14) and the respective molding times approx. 30 seconds (Example 13) and approx. 60 seconds (Example 14).

EXAMPLE 13

Polyol component:
78 parts of a polyether triol (OH number 28) obtained by propoxylation of trimethylol propane and subsequent ethoxylation of the propoxylation product
(PO:EO ratio by weight=78:22),
19.6 parts of ethylene glycol,
1.7 parts of a mixture of 75 parts of the abovementioned polyether triol and 25 parts of zinc stearate,
0.025 part of a commercial tin catalyst (tin catalyst UL 28, a product of Witco Co.) and
0.5 parts of triethylene diamine.
Polyisocyanate component:
150.7 parts of the polyisocyanate preparation of Example 1.
Isocyanate index: 105.
Mechanical data: Unit weight (DIN 53 420): 1119 kg/m$^3$ Tensile strength (DIN 53 504) (RT): 28.2±0.95 MPa Breaking elongation (DIN 53 504) (RT): 76±6%

Tear propagation resistance (DIN 53 515) (RT) 68 35 0.15 KN/m

Sag Test (General Motors Test Method, 100 mm overhang, 1 h, 120° C.): 8.2 mm

Shore D (DIN 53 505): 62

ISO R 75/B-Test: 74° C. Tensile stress 50% (DIN 53 504) (RT): 24.9±0.22 MPa E-modulus in flexur (ASTM D-790) at RT: 470.1 MPa at 120° C.: 36.2 MPa.

EXAMPLE 14

Polyol component:
77 parts of an aminopolyether (NH number 46 mg KOH/g) produced by basic hydrolysis of an NCO-prepolymer obtained by reaction of 2,4-diisocyanatotoluene with a polyol mixture in an NCO:OH equivalent ratio of 2:1, the polyol mixture being a mixture of equal parts by weight of (a) a polyether polyol having an OH number of 35 produced by propoxylation of glycerol and subsequent ethoxylation of the propoxylation product (PO:EO ratio by weight=92:8) and (b) a polyether polyol having an OH number of 56 produced by propoxylation of a mixture of 1 part of trimethylol propane and 1 part of water,
23 parts of DETDA (cf. Example 1),
0.3 parts of triethylene diamine and
0.2 part of the tin catalyst of Example 13.
Polyisocyanate component:
69 parts of the polyisocyanate preparation according to Example 1.
Isocyanate index: 105.
Mechanical data: Unit weight (DIN 53 420): 1132 kg/m$^3$ Tensile strength (DIN 53 504) (RT): 38.1±3.46 MPa Breaking elongation (DIN 53 504) (RT): 162±18%
Tear propagation resistance (DIN 53 515) (RT): 80.0±1.69 KN/m
Sag Test (General Motors Test Method, 100 mm overhang,
30 mins., 160° C.): 9.6 mm
Shore D (DIN 53 505): 70
ISO R 75/B-Test: 123° C.
Tensile stress 50% (DIN 53 504) (RT): 25.8±0.19 MPa
E-modulus in flexur (ASTM D-790) at RT: 581.1 at 120° C.: 242.7
Factor E-modulus: 2.39.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A urea- and/or biuret-modified polyisocyanate having an NCO-content of about 0.7 to 45% by weight which is prepared by reacting
   (A) at least one organic polyisocyanate having an NCO content of about 10 to 50% by weight with
   (B) organic compounds containing isocyanate-reactive groups comprising
       (a) a polyether or polyester having a molecular weight of 500 to about 20,000 and containing at least two isocyanate-reactive groups comprising a member selected from the group consisting of alcoholic hydroxyl groups attached to primary carbon atoms, alcoholic hydroxyl groups attached to secondary carbon atoms, aromatically bound primary amino groups, aromatically bound secondary amino groups, cycloaliphatically bound primary amino groups, cycloaliphatically bound secondary amino groups, aliphatically bound primary amino groups, aliphatically bound secondary amino groups and mixtures thereof, and
       (b) a low molecular weight organic compound comprising
           (1) an aromatic diamine or triamine having a molecular weight of 108 to 499 and containing primary and/or secondary amino groups,
           (3) an aliphatic or cycloaliphatic diamine or triamine having a molecular weight of 60 to 499 and containing primary and/or secondary amino groups,
           (3) an organic compound having a molecular weight of 61 to 499 and containing at least one alcoholic hydroxyl group attached to a primary or secondary carbon atom and at least one aliphatically-, cycloaliphatically- or aromatically-bound primary or secondary amino group,
           (4) a compound containing at least two alcoholic hydroxyl groups and optionally at least one ether or ester group and
           (5) mixtures of (1) to (4),
   wherein the equivalent ratio of isocyanate groups in component (A) to isocyanate-reactive groups in component (B) is about 2:1 to 100:1, the equivalent ratio of isocyanate-reactive groups in component (a) to component (b) is about 100:1 to 0.1:1 and at least 25% of the isocyanate-reactive groups in components (a) and (b) are primary or secondary amino groups.

2. The polyisocyanate of claim 1 wherein component (A) comprises a modified polyisocyanate of the diphenylmethane series which is liquid at room temperature and has an NCO content of about 20 to 32% and comprises a member selected from the group consisting of urethane groups, carbodiimide groups, uretone imine groups and mixtures thereof.

3. The polyisocyanate of claim 1 wherein , component (a) comprises a polyether having a molecular weight of about 1000 to 7000 and wherein at least 50% of the isocyanate-reactive groups of said polyether are selected from the group consisting of aromatically-bound primary amino groups, aliphatically-bound primary amino groups and cycloaliphatically-bound primary amino groups.

4. The polyisocyanate of claim 2 wherein component (a) comprises a polyether having a molecular weight of about 1000 to 7000 and wherein at least about 50% of the isocyanate-reactive groups of said polyether are selected from the group consisting of aromatically-bound primary amino groups, aliphatically-bound primary amino groups and cycloaliphatically-bound primary amino groups.

5. The polyisocyanate of claim 1 wherein component (b) consists of an aromatic diamine containing a $C_1$–$C_4$ alkyl substituent in at least one ortho position to each amino group.

6. The polyisocyanate of claim 2 wherein component (b) consists of an aromatic diamine containing a $C_1$–$C_4$ alkyl substituent in at least one ortho position to each amino group.

7. The polyisocyanate of claim 3 wherein component (b) consists of an aromatic diamine containing a $C_1$–$C_4$ alkyl substituent in at least one ortho position to each amino group.

8. The polyisocyanate of claim 4 wherein component (b) consists of an aromatic diamine containing a $C_1$–$C_4$ alkyl substituent in at least one ortho position to each amino group.

9. The polyisocyanate of claim 1 wherein at least 75% of the isocyanate-reactive groups in components (a) and (b) are primary amino groups.

10. The polyisocyanate of claim 1 wherein the equivalent ratio of isocyanate groups in component (A) to isocyanate-reactive groups in component (B) is about 4:1 to 50:1.

11. The polyisocyanate of claim 1 which comprises reacting components (A) and (B) at a temperature of about 20° to 140° C.

12. A process for the production of an urea and/or biuret-modified polyisocyanate having an NCO-content of about 0.7 to 45% by weight which comprises reacting
    (A) at least one organic polyisocyanate having an NCO content of about 10 to 50% by weight with
    (B) organic compounds containing isocyanate-reactive groups comprising
        (a) a polyether or polyester having a molecular weight of 500 to about 20,000 and containing at least two isocyanate-reactive groups comprising a member selected from the group consisting of alcoholic hydroxyl groups attached to primary carbon atoms, alcoholic hydroxyl groups attached to secondary carbon atoms, aromatically bound primary amino groups, aromatically bound secondary amino groups, cycloaliphatically bound primary amino groups, cycloaliphatically bound secondary amino groups, aliphatically bound primary amino groups, aliphatically bound secondary amino groups and mixtures thereof, and
        (b) a low molecular weight organic compound comprising
            (1) an aromatic diamine or triamine having a molecular weight of 108 to 499 and containing primary and/or secondary amino groups,
            (2) an aliphatic or cycloaliphatic diamine or triamine having a molecular weight of 60 to 499 and containing primary and/or secondary amino groups,
            (3) an organic compound having a molecular weight of 61 to 499 and containing at least one alcoholic hydroxyl group attached to a primary or secondary carbon atom and at least one aliphatically-, cycloaliphatically- or aromatically-bound primary or secondary amino group,
            (4) a compound containing at least two alcoholic hydroxyl groups and optionally at least one ether or ester group and
            (5) mixtures of (1) to (4),
    wherein the equivalent ratio of isocyanate groups in component (A) to isocyanate-reactive groups in component (B) is about 2:1 to 100:1, the equivalent ratio of isocyanate-reactive groups in component (a) to component (b) is about 100:1 to 0.1:1 and at least 25% of the isocyanate-reactive groups in components (a) and (b) are primary or secondary amino groups.

13. A process for the production of a polyisocyanate polyaddition product which comprises reacting the urea- and/or biuret-modified polyisocyanate of claim 1 with at least one compound containing isocyanate-reactive hydrogens.

14. The process of claim 13 wherein said polyisocyanate polyaddition product is a molded plastic having a density of about 0.8 to 1.4 g/cm$^3$ and said process is a reaction injection molding process.

* * * * *